UNITED STATES PATENT OFFICE.

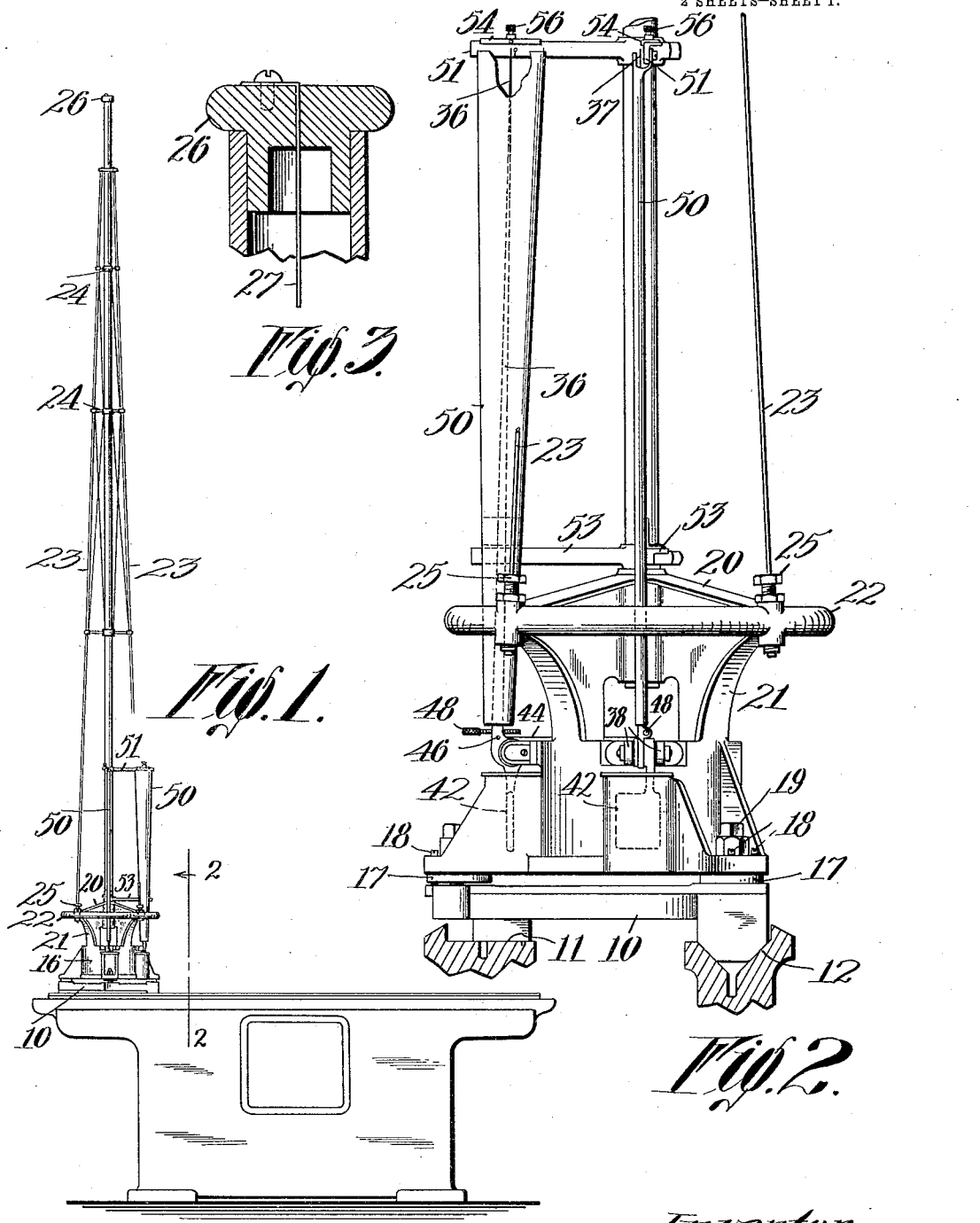

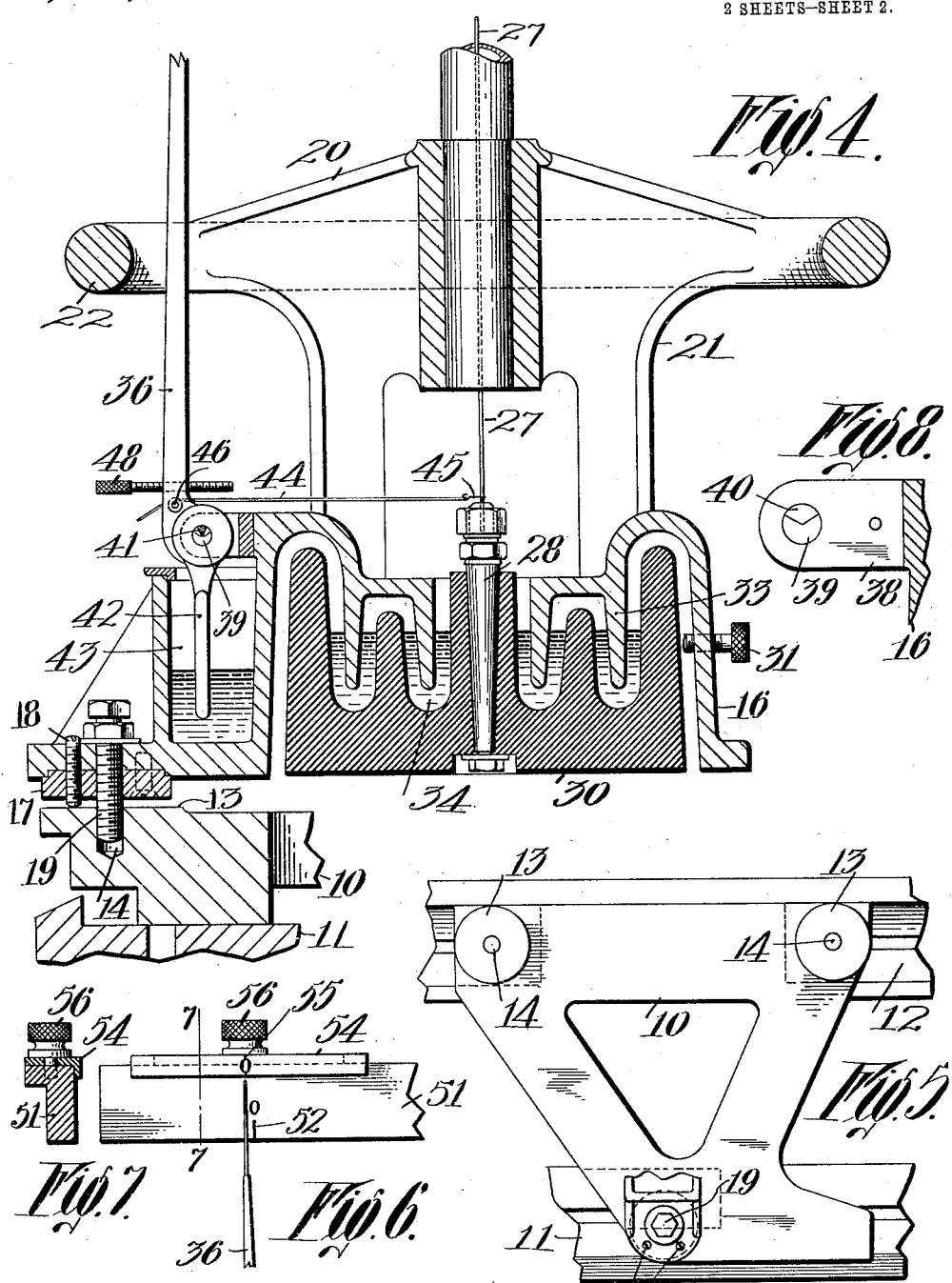

CHARLES H. NORTON, OF WORCESTER, MASSACHUSETTS.

TESTING DEVICE.

1,109,008.  Specification of Letters Patent.  Patented Sept. 1, 1914.

Application filed May 1, 1913. Serial No. 764,747.

*To all whom it may concern:*

Be it known that I, CHARLES H. NORTON, a citizen of the United States, residing at Worcester, in the county of Worcester and State of Massachusetts, have invented a new and useful Testing Device, of which the following is a specification.

The testing of ways for straightness and parallelism is one of the difficult operations in machine building. It has not been unusual to find a bed or base whose ways were not straight or parallel when tested and which seemed to grow worse instead of better by continued scraping. In such cases it has been found necessary in many cases to send the casting back to the planer and have it replaned. The planer is usually depended upon to leave the ways in parallel condition while the straightness of the surfaces is obtained by scraping to a straight edge. The test for parallelism is commonly made with a precision level which can magnify errors only a comparatively small number of times.

This invention is designed for the purpose of providing an extremely sensitive means for testing such surfaces both for parallelism and straightness and doing it with ease, certainty, and a high degree of accuracy, and yet providing adequate protection against the accidental disturbance of the instrument.

The invention also involves various features of construction by which these results are secured.

Reference is to be had to the accompanying drawings in which—

Figure 1 is a side view of an instrument constructed in accordance with this invention shown as applied to a pair of ways for testing them; Fig. 2 is a transverse, sectional view of the ways on the line 2—2 of Fig. 1, on enlarged scale, showing a portion of the instrument in end elevation; Fig. 3 is a central vertical sectional view of the suspending devices at the top greatly enlarged; Fig. 4 is a transverse vertical sectional view of the lower part of the instrument upon enlarged scale; Fig. 5 is a plan of the base thereof; Fig. 6 is a front view of a scale and pointer; Fig. 7 is a sectional view of the same on the line 7—7 of Fig. 6; and Fig. 8 is an end elevation on enlarged scale of one of the suspending points and connected parts.

The device is shown as mounted on a cast foot plate 10. When used to test a pair of ways, one of which is V-shaped and the other flat, it will be understood, of course, that the bearing surfaces on the bottom of the foot plate 10 are arranged accordingly, and in the form shown one of these bearing surfaces, the front one 11 is made flat, and the rear two 12, are made V-shape. This foot plate is shown triangular in form with three raised circular bosses 13 at the angles, each having a central tapped hole 14. It also has a projecting toe at the right in Fig. 5 to afford a long bearing surface.

The instrument is shown as comprising a main body or base 16 preferably of cast aluminum having three points of support or bearing spots, each bearing spot being provided with a hardened and ground steel plate 17, accurately surfaced so that the instrument can be moved over a regular surfaced plate or other part to test its accuracy. In that case of course the foot plate 10 is not used. This body is provided with two adjusting screws 18 at each angle, and with fastening screws 19 entering the holes 14 from above for setting the main body 16 of the instrument relatively to the foot plate 10. Each of these screws extends down through a horizontal flange on the body 16 and through one of the plates 17 secured under the same. The screws 19 are held in adjusted position by lock nuts or the like. The adjusting screws aid in getting an original zero setting for the indicating needles, when the instrument is used on the foot plate.

The body or base 16 is provided with a central vertical mast preferably of Shelby steel tubing and of a material height. The mast is securely guyed and braced. For this purpose the main aluminum body is provided with radiating arms 20 and 21, constituting braces for an integral ring 22. This ring is connected by means of steel guy wires 23 with the top of the mast and these are provided with truss members 24 at intervals along the mast. The wires can be tightened individually by their fastening screws 25. This construction securely guys and braces the mast throughout its length to prevent deflection and vibration either from jar, air currents, or other causes.

At the top of the mast is a top piece 26 centrally perforated and through this perforation passes the top of a piece of fine piano wire 27. It is secured to the top of the top piece 26 and depends down through the mast and below the bottom thereof. At the bottom this wire is provided with a conical member 28 for supporting a heavy weight or pendulum 30. It is secured to the member 28 by nuts in an obvious way, and ordinarily is free to swing, but a knurled screw 31 is provided on the side of the body 16 for holding it in stationary position, when the instrument is to be moved from place to place. Extending down from the upper part of the base 16 are a series of vanes 33 and the lead weight is provided with a corresponding series of depressions 34 constituting reservoirs for receiving oil into which the vanes dip. This is for the purpose of damping the vibrations of the pendulum.

The indicating part of the instrument consists of two needles 36 and 37, each mounted independently of the other and arranged to move in vertical planes at right angles to each other. Each needle is preferably made from thin sheet aluminum formed into a flat tube which tapers to a point at the upper end. The joint along the tube preferably is brazed to make a continuous tubular section having great stiffness in comparison with its size and weight.

Each needle is fulcrumed on ears 38 of the body 16. These are provided with a hardened stud 39 having a ground and lapped V-groove 40 on the top. Each needle has a correspondingly finished steel knife edge 41 resting in this groove. These bearings are practically frictionless. The level of this point or suspension is just above that of the top of the pendulum weight. Each needle projects vertically from its bearing and the lower part of the needle extends downwardly from the fulcrum and is formed into a vane 42 located transverse to the direction of vibration of the needle, that is, parallel with the bearing. The purpose of this vane is two fold;—first, it aids in balancing the needle, and second, it damps the vibrations by dipping into a reservoir 43 of oil, thus helping to get readings readily. Each needle is connected to the pendulum wire by means of a fine cat-gut cord 44, the inner end of which has a hook 45 which passes freely around the suspension wire 27 of the pendulum so as to relieve the cord of any tendency to torsion. The other end of this cord is clamped to the needle just above the fulcrum by means of a small knurled headed screw 46. The weight of each needle is beyond its fulcrum or bearing point, so as to make it tend to hang away from the pendulum.

A little above the point of connection of the cord to the needle is a second small knurled headed screw 48 of considerable length passing through a tapped hole in the fulcrum arm of the needle in the direction in which the needle vibrates, that is, parallel with the cord. Its purpose is to provide the desired adjustment so as to balance the needle for small vibrations when the instrument is being set up.

Each needle is covered by a sheet steel protecting plate or guard 50, to exclude dust, prevent injury, and reduce the possibility of air currents affecting the vibration of the needle.

The upper end of each needle passes across the end of a radial arm 51 which has an index line 52 marked zero. These arms and two lower radial arms 53 support the guards 50. Above this arm 51 is a radially adjustable scale 54 also having a zero index line 55. This plate 54 can be adjusted in the direction of motion of the needle to give a second zero setting if desired, and is secured in adjusted positions by a knurled headed screw 56.

The method of using the instrument will be described with particular reference to the testing of the ways of a grinding machine, which as shown in the drawings, are V-shaped on the rear and flat on the front. A grinding machine bed that has been planed is first scraped in a few spots to be used as bearing places for the foot plate 10. These spots are scraped so that when the instrument is set up and leveled the readings on the two scales are approximately zero, or such as to show only a very slight error. The rest of the surface of the ways between these spots is then scraped to a straight edge, and the entire length carefully tested with the instrument after this is done. As the scraping between these spots is done to a straight edge it is obviously unnecessary to have one long enough to cover the full length of the way, for a straight edge sufficiently long to cover any two adjacent points is sufficient to permit the scraping of the intervening space to a true surface. The instrument, of course, is available for testing the final result after the scraping is finished.

It will be understood, of course, that the amount of multiplication depends upon the relative dimensions of the parts and that small variations in the relative locations of the bearing spots may vary the multiplications considerably. Crosswise of the bed the movement of the pendulum is in proportion to the perpendicular distance between the rear bearing spot and a line passing through the front spots on the one hand and the length of the pendulum from the point of its support to the point of attachment of the cat guts on the other. In the form shown this is about 1 to 10. In this form also the length of the needle from the top to the fulcrum is 50 times that from the point of fastening of the cord to the fulcrum. In this case, therefore, the magnification of the instrument crosswise of the bed is 10x50, or 500 times.

Lengthwise of the bed the multiplication in the instrument shown is not quite so great. The lifting of one front corner multiplies the motion of the pendulum by a smaller amount than 10, and the total magnification is in this case about 433 times. The different proportions of the base of the instrument and different heights of mast and lengths of needle will, of course, affect these degrees of multiplication.

It has been found in practice that the sensitiveness of the instrument is very great. Without the sheet metal guards 50 currents of air in the shop were sufficient to keep the needles swinging and air set in motion by a person walking near would move the needles. It has also been found in practice that if the two guy wires opposite one of the needles are grasped in the hands, and six or eight passes made over them, the expansion of these wires, due to the heat, is sufficient to throw the opposite needle off the scale.

The purpose of making most of the parts with the exception of the suspension, guy, and truss wires, and the fastening devices, of aluminum is first to make the instrument as light as possible so that it can be transported around the shop, and second in the case of the needles, to make their motion as easy and frictionless as possible. Obviously, the pendulum can exert no force when it is at rest, and as it approaches that position the force becomes smaller and smaller; therefore, to get a maximum degree of sensitiveness the resistance of the needles must be reduced to the minimum.

It will be noticed that the direction of motion from the point of the needle is always the same as the direction in which the pendulum moves from the normal central position. This is due, of course, to the fact that the connection between the pendulum and the needle is above the fulcrum of the pendulum. The weight of each needle is beyond its fulcrum so that it hangs away from the pendulum except as constrained by the motion of the latter.

Although I have illustrated and described only a single form of the invention and indicated it as particularly designed for one special purpose, I am aware of the fact that many modifications can be made therein and that it can be used for many similar purposes without departing from the scope of the invention as expressed in the claims. Therefore, I do not wish to be limited in these respects, but What I do claim is:—

1. In an instrument of the class described, the combination with a main body, a mast extending upwardly from the body, a pendulum depending freely from the top of said mast, an indicating needle pivoted on the main body and connected with said pendulum for registering the vibrations thereof, and a scale carried by said mast at a point above the top of said main body over which said needle swings.

2. In an instrument of the class described, the combination with a main body, a mast extending upwardly from the body, a weight depending from the top of said mast, and two indicating needles at right angles to each other, both connected with said weight for registering the vibrations thereof.

3. In an instrument of the class described, the combination with a main body, a mast extending upwardly from the body, a pendulum depending freely from the top of said mast, an indicating needle pivoted on the main body, and connected with said pendulum for registering the vibrations thereof, and means carried by said main body for damping the vibrations of the needle.

4. In an instrument of the class described, the combination of the main body, a mast projecting upwardly therefrom, a wire depending from the top of said mast, a weight hung on the bottom of said wire and located within said body, said weight having reservoirs for liquid in the top surface thereof, and the body having vanes extending down into said reservoirs for damping the vibrations of the weight.

5. In an instrument of the class described, the combination of a mast, a wire secured to the top of said mast and depending from it, a weight hung on the bottom of said wire, means for damping the vibrations of the weight, a bearing point at a higher level than the top of said weight, an indicating needle pivoted on said bearing point, and a flexible connection from the indicating needle to the weight for causing the needle to move with the weight.

6. In an instrument of the character described, the combination of a pendulum, a bearing point, a needle having a bearing point resting on the first named bearing point and adapted to swing thereon, the main body of said needle being located beyond said bearing point, and a flexible connection from a point on the needle just above the bearing points to the pendulum, whereby vibrations of the pendulum are transmitted to the needle.

7. In an instrument of the character described, the combination of a pendulum, a bearing point, a needle having a bearing point resting on the first named bearing point and adapted to swing thereon, a flexible connection from the needle to the pendulum, and a balancing screw adjustably mounted on the needle parallel with said flexible connection.

8. In an instrument of the character described, the combination of a main body, a weight supported therein and depending from a point at an elevation above said body so as to be capable of swinging within the body, a bearing point on the body, a needle having a bearing point resting on the first named bearing point and adapted to swing thereon, the main body of said needle being located beyond said bearing points, and a flexible connection from the weight to a point on the needle just above the bearing points, whereby vibrations of the weight are transmitted to the needle, said body being provided with a reservoir for liquid below said bearing points, and the needle having a vane extending down into the liquid in said receptacle for damping the vibrations of the needle and aiding in balancing the needle.

9. In an instrument of the character described, the combination of a main body, a weight depending from a point at an elevation above said body so as to be capable of swinging, a bearing point on the body, a needle having a bearing point resting on the first named bearing point and adapted to swing thereon, a flexible connection from the weight to a point on the needle just above the bearing points, and means for damping the vibrations of the needle and aiding in balancing the needle.

10. In an instrument of the character described, the combination of a main body, a weight depending from a point at an elevation above said body so as to be capable of swinging, a bearing point on the body, a needle having a bearing point resting on the first named bearing point and adapted to swing thereon, a flexible connection from the needle to the weight, whereby vibrations of the weight are transmitted to the needle, and a radial arm extending outwardly from the main body at a point adjacent to the top of said needle and having a zero point thereon.

11. In an instrument of the character described, the combination of a main body, a weight depending from a point at an elevation above said body, a needle resting on the body and adapted to swing thereon, a flexible connection from the needle to the weight, whereby vibrations of the weight are transmitted to the needle, a radial arm extending outwardly from the main body at a point adjacent to the top of said needle, and having a zero point thereon, and a radially adjustable scale on said arm also having a zero point thereon.

12. In an instrument of the character described, the combination of the main body, a hollow mast extending upwardly from the center thereof, braces extending outwardly from said body near the bottom of said mast, guy wires connected with the top of said mast and with said braces, truss wires connecting said guy wires at points between the braces and the top of the mast, a suspension wire extending down through the mast from the top thereof, and a heavy weight suspended on the lower end of said suspension wire.

13. In an instrument of the class described, the combination of a main body of aluminum having an integral ring surrounding it near the top thereof, a hollow steel mast extending up from the center of said main body, wires adjustably connected with said ring and with the top of said mast for steadying it, a cap in the top of said mast, a wire secured to said cap and extending downwardly therefrom through the mast, a weight hung at the lower end of said wire, and means for showing minute vibrations of said weight.

14. In an instrument of the class described, the combination of a main base, a heavy pendulum hung therein from a height and free to swing in the base, means for indicating minute vibrations of said pendulum, and a plurality of bearing plates on the bottom of said base projecting beyond the lower surface thereof and accurately surfaced on their bottoms.

15. In an instrument of the class described, the combination of a main base, a heavy pendulum hung therein from a height and free to swing, means for indicating minute vibrations of said pendulum, a plurality of bearing plates on the bottom of said base projecting beyond the lower surface thereof, a foot plate under said base having bearing spots thereon, screws extending down through the base and bearing plates into contact with said bearing spots for leveling the base, and additional screws extending down into the foot plate for securing the base in adjusted positions.

16. In an instrument of the class described, the combination of a main body having a projecting ring surrounding it near the top thereof, a mast extending up from the center of said main body through the ring and above it, wires adjustably connected with said ring and with the upper part of said mast for steadying it, a wire extending down through the mast from the top thereof, and a weight hung at the lower end of said wire and constituting a pendulum.

In testimony whereof I have hereunto set my hand in the presence of two subscribing witnesses.

CHARLES H. NORTON.

Witnesses:
HOWARD W. DUNBAR,
ALBERT TURNER.